United States Patent
Burley

(10) Patent No.: US 9,082,216 B2
(45) Date of Patent: Jul. 14, 2015

(54) SYSTEM AND METHOD FOR FILTER KERNEL INTERPOLATION FOR SEAMLESS MIPMAP FILTERING

(75) Inventor: Brent Burley, Monterey Park, CA (US)

(73) Assignee: Disney Enterprises, Inc., Burbank, CA (US)

( * ) Notice: Subject to any disclaimer, the term of this patent is extended or adjusted under 35 U.S.C. 154(b) by 1183 days.

(21) Appl. No.: 12/459,560

(22) Filed: Jul. 1, 2009

(65) Prior Publication Data

US 2011/0001756 A1    Jan. 6, 2011

(51) Int. Cl.
*G06T 15/04*      (2011.01)

(52) U.S. Cl.
CPC ........................... *G06T 15/04* (2013.01)

(58) Field of Classification Search
None
See application file for complete search history.

(56) References Cited

U.S. PATENT DOCUMENTS

| | | | |
|---|---|---|---|
| 5,757,374 A | 5/1998 | Nakamura | |
| 6,005,582 A * | 12/1999 | Gabriel et al. | 345/586 |
| 6,292,193 B1 * | 9/2001 | Perry et al. | 345/582 |
| 6,304,268 B1 | 10/2001 | Iourcha | |
| 6,333,743 B1 | 12/2001 | Gossett | |
| 6,583,787 B1 | 6/2003 | Pfister | |
| 6,753,870 B2 | 6/2004 | Deering | |
| 6,778,181 B1 | 8/2004 | Kilgariff | |
| 6,819,324 B2 | 11/2004 | Emberling | |
| 6,850,243 B1 | 2/2005 | Kilgariff | |
| 2002/0000988 A1 | 1/2002 | Nelson | |
| 2003/0080963 A1 | 5/2003 | Van Hook | |
| 2003/0234791 A1 | 12/2003 | Boyd | |
| 2004/0054869 A1 | 3/2004 | Igarashi | |
| 2004/0257376 A1 * | 12/2004 | Liao et al. | 345/587 |
| 2005/0062738 A1 | 3/2005 | Handley | |
| 2005/0128213 A1 * | 6/2005 | Barenbrug et al. | 345/587 |
| 2006/0158451 A1 | 7/2006 | Barenbrug | |
| 2006/0232596 A1 | 10/2006 | Barenburg | |

(Continued)

FOREIGN PATENT DOCUMENTS

EP     0 447 227 A2     9/1991

OTHER PUBLICATIONS

Ewins, J. P, et al. "Mip-Map Level Selection for Texture Mapping" IEEE Transaction on Visualization and Computer Graphics, IEEE Service Center, Los Alamitos, CA, US. vol. 4, No. 4, (Oct. 1, 1998) pp. 317-329.

(Continued)

*Primary Examiner* — Aaron M Richer
(74) *Attorney, Agent, or Firm* — Farjami & Farjami LLP

(57) ABSTRACT

There is provided a system and method for filter kernel interpolation for seamless mipmap filtering. There is provided a method of implementing a filter kernel interpolation for seamless filtering of transitions within a plurality of mipmaps derived from a base-image texture filtered using a prefilter, the method comprising choosing a filter kernel, determining a filter width for the filter kernel, selecting a first mipmap and a second mipmap from the plurality of mipmaps, applying interpolation on the filter kernel based on the prefilter, the first mipmap, and the second mipmap to generate an interpolated filter kernel, and applying the interpolated filter kernel to the first mipmap to generate a seamless filtered texture. Two alternative methods of interpolation are introduced, including filter kernel value interpolation and filter kernel position interpolation with x-lerping. By avoiding access to the second mipmap, greater efficiency and image quality can be achieved versus conventional interpolation.

24 Claims, 5 Drawing Sheets

(56) References Cited

U.S. PATENT DOCUMENTS

| 2006/0250405 | A1 | 11/2006 | Cook |
| 2007/0165035 | A1 | 7/2007 | Duluk, Jr. |
| 2007/0171234 | A1* | 7/2007 | Crawfis et al. ............ 345/587 |
| 2008/0198168 | A1 | 8/2008 | Jiao |
| 2008/0309676 | A1 | 12/2008 | Nehab |
| 2009/0021522 | A1 | 1/2009 | Burley |
| 2009/0027391 | A1 | 1/2009 | Burley |
| 2009/0027412 | A1 | 1/2009 | Burley |

OTHER PUBLICATIONS

Williams, L., *Pyramidal Parametrics*, Computer Graphics 17,3 (Jul. 1983), 1-11.

Heckbert, P.S., *Survey of Texture Mapping*, IEEE Computer Graphics and Applications (Nov. 1986), 56-67.

Peachey, D., *Texture on Demand*, Tech. Rep. 217, Pixar, San Rafael, CA, USA, 1990.

Burley, et al., *Ptex: Per-Face Texture Mapping for Production Rendering*, Eurographics Symposium on Rendering 2008, 27,4 (2008).

Heckbert, P.S., *Fundamentals of Texture Mapping and Image Warping*. Master's Thesis, U.C. Berkeley, 1989.

Mitchell, et al. *Reconstruction Filters in Computer Graphics*, Computer Graphics 22, 4 (Aug. 1988), 221-228.

Praun, et al. *Lapped Textures*, Princeton University and Microsoft Research, 2000.

Schneider, et al., *Real-Time Editing, Synthesis, and Rendering of Infinite Landscapes on GPUs*, Technical University at Munich, 2006.

Stoll, et al., *Razor: An Architecture for Dynamic Multiresolution Ray Tracing*, Tech. Rep. TR-06-21, University of Texas, TX, USA, 2006.

* cited by examiner

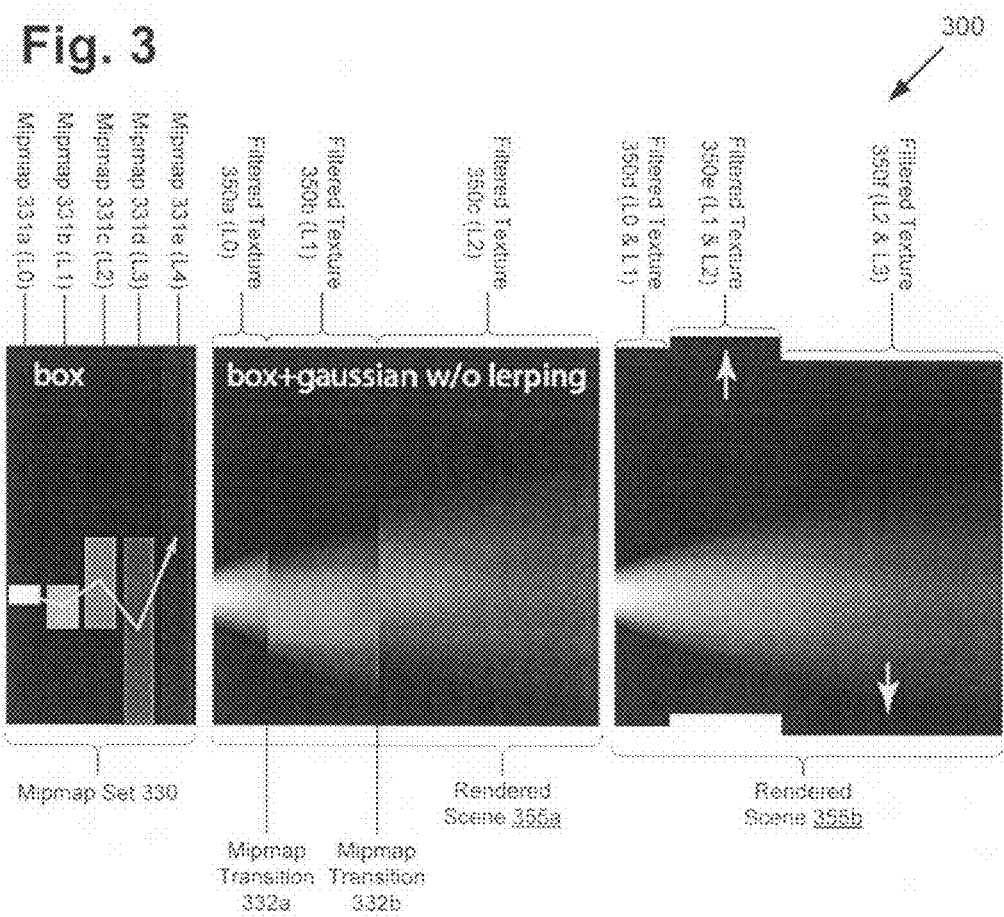

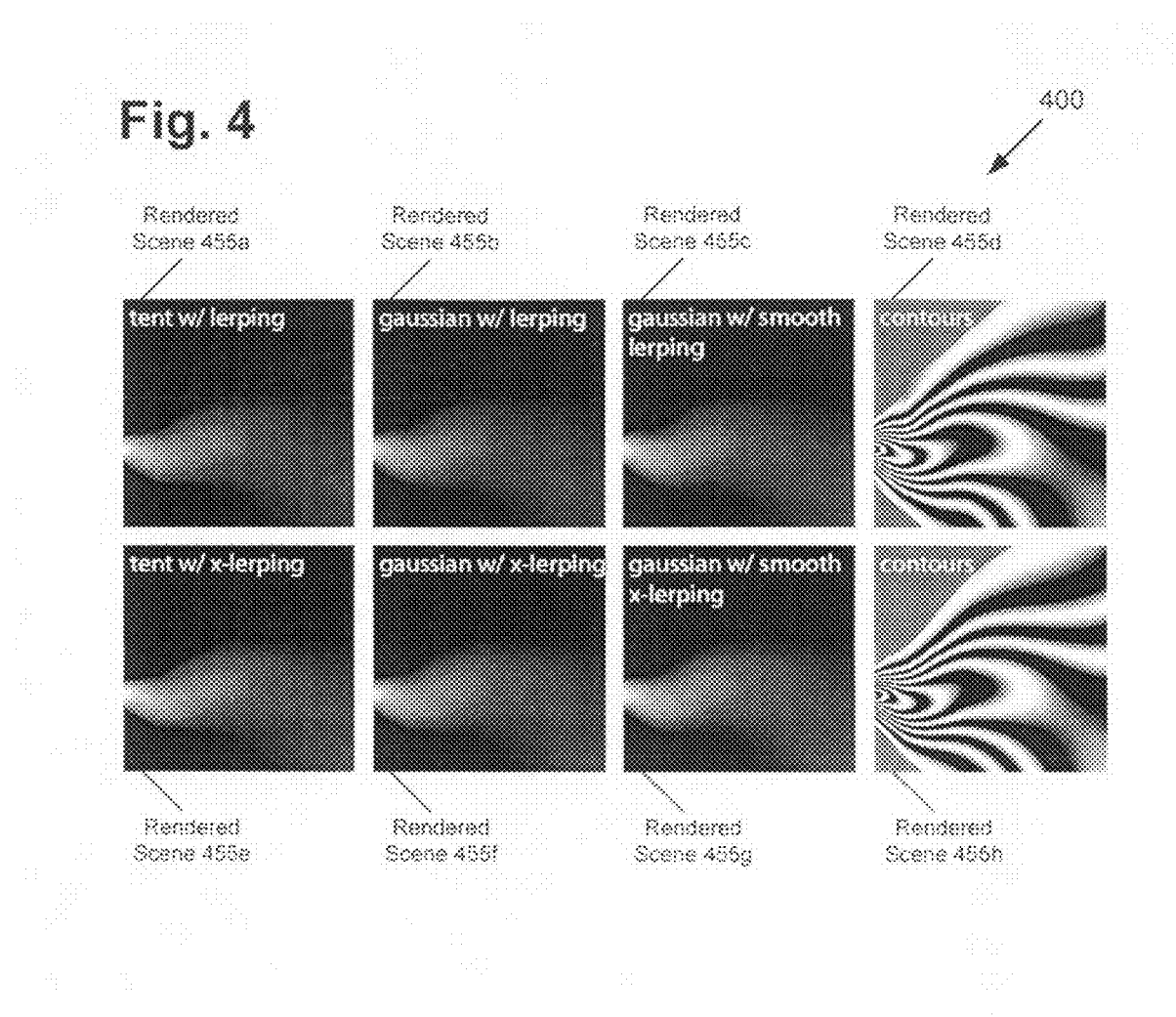

SYSTEM AND METHOD FOR FILTER KERNEL INTERPOLATION FOR SEAMLESS MIPMAP FILTERING

BACKGROUND OF THE INVENTION

1. Field of the Invention

The present invention relates generally to computer generated images. More particularly, the present invention relates to mipmap filtering with increased efficiency and quality.

2. Background Art

Mipmapping is a common technique used to accelerate texture mapping for computer generated three-dimensional rendering applications. Such applications may include rendering for animated films and other media, or real-time rendering for videogames and other simulations. By calculating in advance a set of pre-filtered reductions or mipmaps from a high-resolution texture, a renderer can select a mipmap closely matching a resolution of a projected mapping of the texture instead of always using the original high-resolution texture. In this manner, filtering operations can operate faster on lower resolution mipmaps, shortening rendering time or increasing real-time performance, sometimes by orders-of-magnitude, with very little quality degradation.

One difficulty arising from the use of mipmaps is visual artifacting that results from the renderer filtering between mipmap transitions in a rendered scene. For example, a tiled texture on a floor or wall in perspective may appear to have abrupt changes in resolution as the renderer switches from one mipmap level to another. One way this is commonly addressed is by using trilinear interpolation or other interpolation methods that read texels from two mipmap levels, smoothly blending between the two. However, reading the texels of multiple mipmap levels may place a large I/O burden on the renderer, particularly for high-resolution textures having many mipmaps, reducing rendering efficiency.

Accordingly, there is a need to overcome the drawbacks and deficiencies in the art by finding a way to implement efficient mipmapping while maintaining high filter interpolation quality.

SUMMARY OF THE INVENTION

There are provided systems and methods for filter kernel interpolation for seamless mipmap filtering, substantially as shown in and/or described in connection with at least one of the figures, as set forth more completely in the claims.

BRIEF DESCRIPTION OF THE DRAWINGS

The features and advantages of the present invention will become more readily apparent to those ordinarily skilled in the art after reviewing the following detailed description and accompanying drawings, wherein:

FIG. 3 presents a diagram illustrating a rendering through progressively larger widths with and without filter kernel interpolation for seamless mipmap filtering, according to one embodiment of the present invention;

FIG. 4 presents a diagram illustrating filter kernel interpolation for seamless mipmap filtering using several different filter kernels with or without x-lerping, according to one embodiment of the present invention.

DETAILED DESCRIPTION OF THE INVENTION

The present application is directed to a system and method for filter kernel interpolation for seamless mipmap filtering. The following description contains specific information pertaining to the implementation of the present invention. One skilled in the art will recognize that the present invention may be implemented in a manner different from that specifically discussed in the present application. Moreover, some of the specific details of the invention are not discussed in order not to obscure the invention. The specific details not described in the present application are within the knowledge of a person of ordinary skill in the art. The drawings in the present application and their accompanying detailed description are directed to merely exemplary embodiments of the invention. To maintain brevity, other embodiments of the invention, which use the principles of the present invention, are not specifically described in the present application and are not specifically illustrated by the present drawings.

Figure 1:
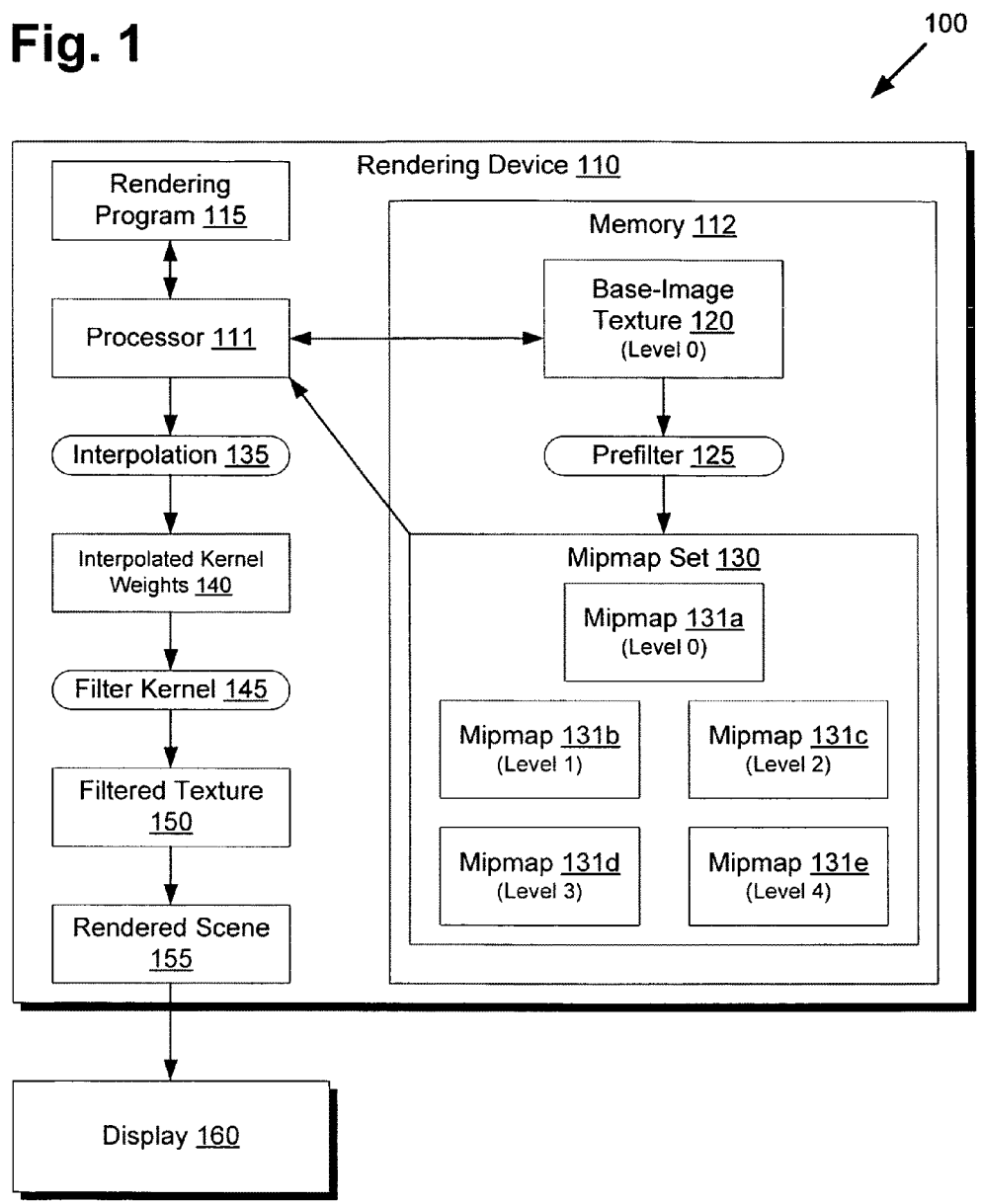
FIG. 1 presents a rendering device using filter kernel interpolation for seamless mipmap filtering, according to one embodiment of the present invention.

FIG. 1 presents a rendering device using filter kernel interpolation for seamless mipmap filtering, according to one embodiment of the present invention. Environment 100 of FIG. 1 includes rendering device 100 and display 160. Rendering device 100 includes processor 111, memory 112, rendering program 115, interpolation 135, interpolated kernel weights 140, filter kernel 145, filtered texture 150, and rendered scene 155. Memory 112 includes base-image texture 120, prefilter 125, and mipmap set 130. Mipmap set 130 includes mipmaps 131a-131e.

FIG. 1 presents an overview of an exemplary rendering device 110 for generating rendered scene 155. As shown in FIG. 1, memory 112 already stores base-image texture 120, which corresponds to a level 0 mipmap. Base-image texture 120 may comprise a one, two, or even three-dimensional texture for mapping onto surfaces, although a two-dimensional texture may be most commonly used for a typical three-dimensional renderer. Dimension is being used here in the sense of the domain of the texels, such as X, Y, Z axes, rather than the range of texels, such as for example red-green-blue (RGB) color channels. Base-image texture 120 comprises a map of surface colors, which might comprise a plurality of texels in a red-green-blue (RGB) or red-green-blue-alpha (RGBA) format. Processor 111 may be directed by rendering program 115 to generate mipmap set 130 in advance by applying prefilter 125 to base-image texture 120. If mipmap set 130 comprises a set of symmetric power-of-two reductions, then a simple successive averaging algorithm or box prefilter may be used to generate mipmaps 131b-131e of mipmap set 130, and mipmap 131a may simply copy base-image texture 120 without modification. However, other prefilters such as a tent or gaussian filter may be used as well. As a result, base-image texture 120 and mipmap 131a may correspond to a 16 texel 1D texture, mipmap 131b may correspond to an 8 texel 1D texture, mipmap 131c may correspond to a 4 texel 1D texture, mipmap 131d may correspond to a 2 texel 1D texture, and mipmap 131e may correspond to a 1 texel 1D texture.

Alternative embodiments may further include asymmetric ripmaps in addition to standard symmetric mipmaps. Additionally, processor 111 might store only the most commonly anticipated mipmaps within mipmap set 130 and generate the rest on demand. For example, a floor texture might include a symmetric mipmap set and an asymmetric ripmap set retaining high resolution along the horizontal axis in anticipation of the renderer tiling the floor texture on a horizontal plane at an oblique angle to the view camera. Since asymmetric ripmaps retaining high resolution along the vertical axis may be accessed very infrequently for a floor texture, these ripmaps might be omitted from mipmap set 130 and instead generated on demand.

While only a single base-image texture 120 and associated mipmap set 130 are stored in memory 112, rendering device 110 may typically have access to several different base-image textures and corresponding mipmap sets for reconstructing rendered scene 155. In this manner, rendering device 110 can select from various textures suitable for mapping onto surfaces of three-dimensional models, producing a more realistic and detailed rendered scene 155. However, for simplicity, only a single base-image texture 120 and mipmap set 130 are shown in FIG. 1.

After rendering program 115 decides a surface for base-image texture 120 to be mapped on, base-image texture 120 must be scaled to match the projection of the surface by a particular camera view used by rendering program 115. That is, if the surface is on a distant object relative to the camera view, the texture needs to be scaled down or minified, and if the surface is close to the camera view, the texture needs to be scaled up or magnified, and if the surface is not directly facing the camera view, which is likely to be the case, the renderer will need to transform the texture to match the proper surface orientation relative to the camera view.

In other words, there is generally not a one-to-one correspondence between the texels of base-image texture 120 as projected on a surface and the pixels comprising display 160, so rendering program 115 must determine how to filter the texels as pixels of display 160 may correspond to several texels or fractional texels. This filtering process is necessary since memory 112 only contains base-image texture 120 at specific resolutions contained in mipmap set 130, whereas mapping the texture may require any arbitrary resolution depending on the positioning of a surface to be mapped.

In general, this filtering process might be accomplished by selecting one or more mipmaps from mipmap set 130 and applying interpolation 135 and filter kernel 145. An appropriate mipmap level is chosen based on the minimum resolution necessary to retain rendering quality while simultaneously reducing rendering workload, which generally corresponds to a mipmap level having texels just smaller than a chosen filter width corresponding to a desired rendering resolution. If interpolation between mipmap levels is desired to avoid discontinuities when switching mipmap levels, then a second mipmap level L+1 may also be necessary for interpolation. Furthermore, if anisotropic filtering is desired, then interpolation needs to be considered for each separate axis; for example, a two-dimensional texture requires four mipmap levels to be interpolated. Conventionally, this is accomplished by linear interpolation or lerping separately evaluated filter kernels for each mipmap, referred to as trilinear interpolation when used with a linear filter kernel. However, this conventional interpolation technique is an expensive operation due to the necessity of accessing and filtering each mipmap individually, increasing input/output (I/O) overhead and reducing efficiency. The filter kernel interpolation technique of this application avoids the efficiency problems of the conventional interpolation technique by calculating interpolated kernel weights 140 instead of interpolating between mipmaps, as further discussed below.

Once interpolated kernel weights 140 are calculated and applied to a surface via filter kernel 145, it may result in filtered texture 150, which can then be incorporated along with other filtered textures into rendered scene 155 as a final result. Then, rendered scene 155 can be output directly to display 160 for viewing, or may be written to storage such as a hard disk drive for future retrieval and output to display 160 or another display. If rendering program 115 is generating an animation rather than a still frame, then a rendered scene 155 will be generated for each animation frame and updated on display 160 or successively written to the storage.

Figure 2A:
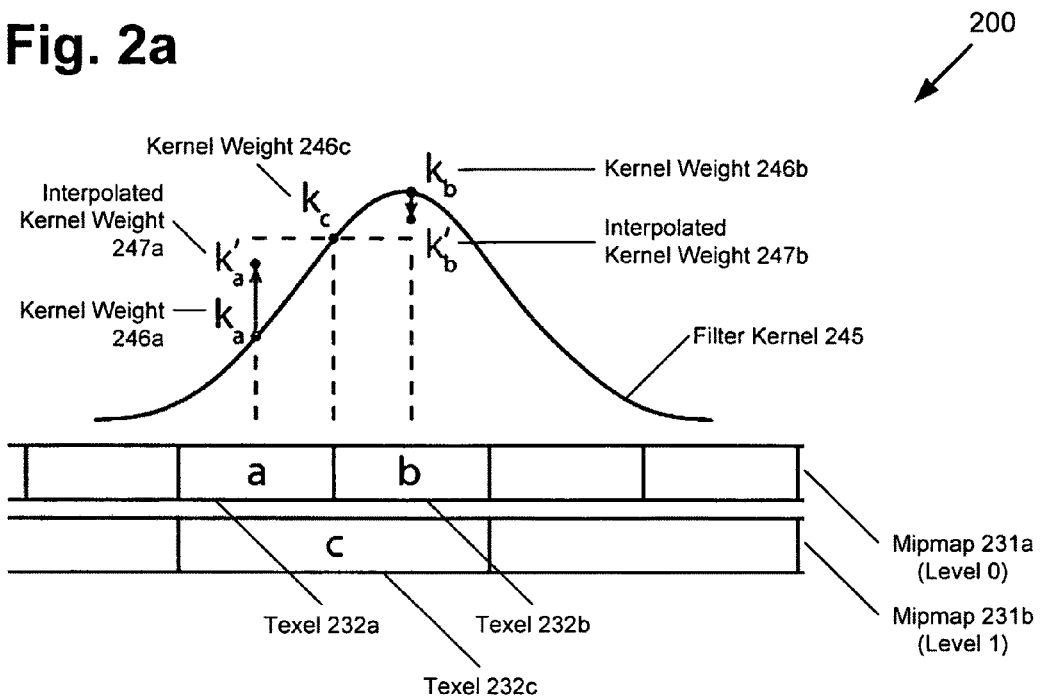
FIG. 2a presents a diagram illustrating filter kernel value interpolation for seamless mipmap filtering, according to one embodiment of the present invention.

FIG. 2a presents a diagram illustrating filter kernel value interpolation for seamless mipmap filtering, according to one embodiment of the present invention. Diagram 200 of FIG. 2a includes mipmaps 231a-231b, filter kernel 245, kernel weights 246a-246c, and interpolated kernel weights 247a-247b. Mipmap 231a includes texels 232a-232b, and mipmap 231b includes texel 232c. With regards to FIG. 2a, it should be noted that mipmap 231a corresponds to mipmap 131a from FIG. 1, and that mipmap 231b corresponds to mipmap 131b.

FIG. 2a illustrates the technique described as filter kernel value interpolation, which is generally usable for any type of prefilter and filter kernel. By taking into account the type of prefilter used for mipmap generation, a function with a result mathematically equivalent to the traditional interpolation technique can be derived by substituting an expected data value from the second mipmap level L+1 on the fly, rather than accessing it from the stored mipmap level L+1. In the case of a box prefilter in one dimension, since it is a known property that a texel reduction is simply the average of the adjacent two texels from a higher resolution mipmap, the traditional interpolation technique simplifies to an interpolation between the kernel weights of the two mipmap levels used for a filtering of the higher resolution mipmap level L alone. Thus, mipmap level L+1 does not need to be accessed at all, reducing I/O workload and improving efficiency of filtering while retaining the same quality result.

To discuss in further detail, an appropriate mipmap level as discussed above may be determined with the equation:

$$L=\text{floor}(\log_2 w)$$

wherein L is the chosen mipmap level, floor corresponds to the integer floor function, and w is the chosen filter width for filtering the texture onto a surface expressed in pixels of base-image texture 120. The equation above is one method of determining a mipmap level based on a chosen filter width; similar alternative formulations may also be used, such as for example an equation using a ceiling function instead of a floor function, or an equation subtracting a constant value offset from the level value to minimize prefilter aliasing.

If the filter kernel is variable width, this generally results in a filter width factor varying between one to two texels of the chosen mipmap level, as the mipmaps were generated using successive power-of-two reductions:

$$\omega = w/2^L$$

wherein $\omega$ is the filter width factor, w is the filter width, and L is the selected mipmap level. If the filter kernel is fixed width, the filter width factor may be unity or one texel. A kernel width may be chosen as four times the filter width factor, resulting in a kernel evaluating four to eight samples for each evaluated axis. Additionally, an interpolation fraction may be derived from the filter width factor:

$$\lambda = \omega - 1$$

wherein λ is the interpolation fraction, and ω is the filter width factor. The interpolation fraction represents relative weights for mipmap levels L+1 and L when interpolating; that is, for the example shown in FIG. 2a:

$$f_{abc}=(k_a d_a+k_b d_b)(1-\lambda)+k_c d_c \lambda$$

wherein $f_{abc}$ represents the final interpolated values, $k_a$ is kernel weight 246a, $d_a$ is the data value of texel 232a, $k_b$ is kernel weight 246b, $d_b$ is the data value of texel 232b, λ is the interpolation fraction, $k_c$ is kernel weight 246c, and $d_c$ is the data value of texel 232c. Kernel weights 246a-246c are defined in relation to filter kernel 245, which takes the shape of the filter curve shown in FIG. 2a. However, filter kernel 245 may be defined using any desired filter shape, such as tent, gaussian, B-spline, or some other filter function.

Explaining the equation of $f_{abc}$ in another manner, the closer the filter width w is to the texels of mipmap 231a rather than the texels of mipmap 231b, the larger the relative weight, (1−λ), of the contributing components of mipmap 231a, $(k_a d_a+k_b d_b)$. Conversely, the closer the filter width w is to the texels of mipmap 231b rather than the texels of mipmap 231a, the larger the relative weight, λ, of the contributing components of mipmap 231b, $k_c d_c$.

As previously noted, since it is assumed the mipmaps were generated with a box prefilter, the data value of texel 232c can be derived by simply substituting the average of the data values for texels 232a-232b, or:

$$d_c=(d_a+d_b)/2$$

Substituting this $d_c$ into the previous equation for $f_{abc}$ and refactoring yields:

$$f_{abc}=(k_a(1-\lambda)+k_c\lambda/2)d_a+(k_b(1-\lambda)+k_c\lambda/2)d_b$$

which may be rewritten as:

$$f_{abc}=k'_a d_a+k'_b d_b$$

where $k'_a=(k_a(1-\lambda)+k_c\lambda/2)$ and $k'_b=(k_b(1-\lambda)+k_c\lambda/2)$.

As shown by the equations for $k'_a$ and $k'_b$, the kernel weights simplify to an interpolation towards $k_c$, which is shown in FIG. 2a via interpolated kernel weight 247a for $k'_a$ and interpolated kernel weight 247b for $k'_b$. Since $d_c$ drops out of the final equation for $f_{abc}$, there is no need to read mipmap 231b and apply filter kernel 245 separately to mipmap 231b, greatly increasing rendering speed while maintaining the same interpolated filter quality. Although FIG. 2a focuses on a single dimensional application, the process shown in FIG. 2a can easily be extended to multiple dimensions by iterating a separable kernel over each axis. The resulting efficiency benefits are even greater for applications using anisotropy for the filter kernel, as several mipmap and/or ripmap comparisons can be completely avoided.

Figure 2B:
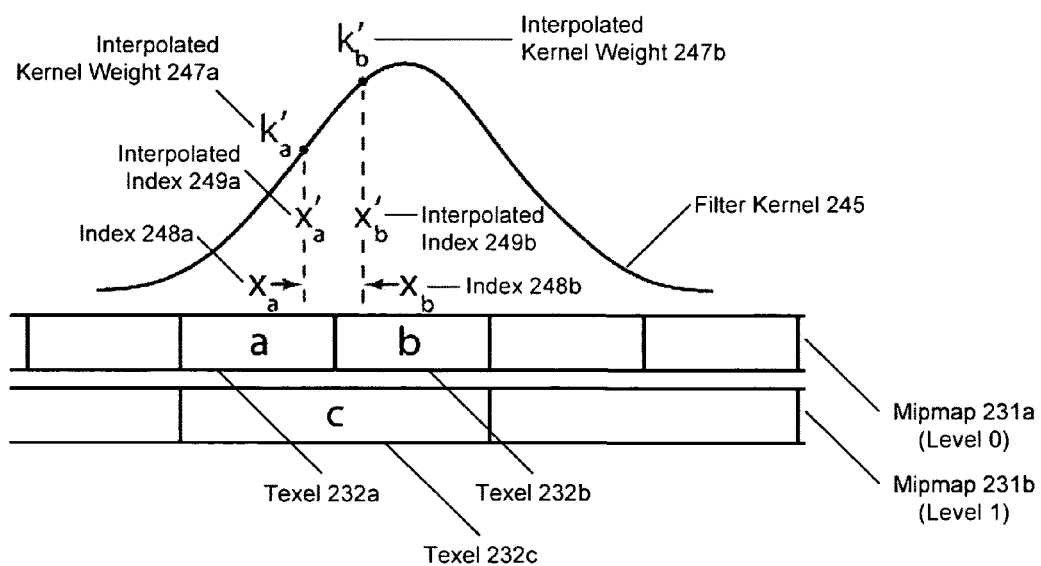
FIG. 2b presents a diagram illustrating filter kernel position interpolation for seamless mipmap filtering, according to one embodiment of the present invention.

FIG. 2b presents a diagram illustrating filter kernel position interpolation for seamless mipmap filtering, according to one embodiment of the present invention. Diagram 200 of FIG. 2b includes mipmaps 231a-231b, filter kernel 245, interpolated kernel weights 247a-247b, indexes 248a-248b, and interpolated indexes 249a-249b. Mipmap 231a includes texels 232a-232b, and mipmap 231b includes texel 232c. With regards to FIG. 2b, it should be noted that mipmap 231a corresponds to base-image texture 120 from FIG. 1, and that mipmap 231b corresponds to mipmap 131b.

FIG. 3 presents a diagram illustrating a rendering through progressively larger filter widths with and without filter kernel interpolation for seamless mipmap filtering, according to one embodiment of the present invention. Diagram 300 of FIG. 3 includes mipmap set 330, rendered scene 355a, and rendered scene 355b. Mipmap set 300 includes mipmaps 331a-331e. Rendered scene 355a includes filtered textures 350a-350c and mipmap transitions 332a-332b. Rendered scene 355b includes filtered textures 350d-350f. With regards to FIG. 3, it should be noted that mipmap set 330 corresponds to mipmap set 130 from FIG. 1, and that rendered scenes 355a-355b correspond to rendered scene 155.

FIG. 2b takes a different approach than the method used for FIG. 2a. Instead of interpolating kernel weights as in FIG. 2a, FIG. 2b focuses on interpolating index positions and using those interpolated index positions to determine kernel weights. Focusing on FIG. 3, it can be seen that mipmap set 330 has been generated using a box prefilter, with the original texture or mipmap 331a comprising a single white texel in a one-dimensional 16-texel array. Examining rendered scene 355a, it should be apparent that without using interpolation or lerping, any filter kernel using mipmaps will result in the appearance of position shifts or discontinuities at mipmap transitions such as mipmap transitions 332a-332b. This is also demonstrated by the apparently shifting texel position in mipmap set 330 indicated by the arrow. While generally it may be impossible in practice to shift filtered textures 350a-350c back into alignment due to differing shifts for each texel, if the prefilter is a box prefilter, then it is possible to realign the result by shifting the texels themselves during filter convolution. Thus, a new interpolation technique named "x-lerping" shall be utilized to realign the slices of filtered textures 35a-350c into a clean and seamless continuous result shown by filtered textures 350d-350f of rendered scene 355b. In other words, the "x-lerping" technique adjusts the positions of texels to offset the discontinuities introduced by the box prefilter:

$$x'_i=x_i+\lambda/2 \text{ if i is even}$$

$$x'_i=x_i-\lambda/2 \text{ if i is odd}$$

wherein $x'_i$, the x-lerped position, replaces the value of $x_i$, the original texel position, during filter kernel computations evaluated on a higher resolution mipmap level L.

As with filter kernel value interpolation, filter kernel position interpolation does not require access or kernel filter processing of additional mipmap levels other than the higher resolution mipmap level L. Moreover, with filter kernel position interpolation, improved visual quality may result, kernel weights only need to be computed for a single mipmap level L, and positions may be interpolated separately even with a non-separable kernel such as the elliptical gaussian. However, filter kernel position interpolation is only applicable to a variable-width filter kernel with mipmaps generated using a box prefilter as in FIG. 3, unlike the more generally applicable filter kernel value interpolation method. Thus, either filter kernel position interpolation or filter kernel value interpolation may prove to be more suitable depending on the particular requirements of a renderer or application.

To discuss in further detail, a general convolution equation for FIG. 2b may be written as follows:

$$f(x)=(\Sigma_i k(|x-x_i|/\omega)d_i)/\Sigma_i k(|x-x_i|/\omega)$$

where x is a 1-tuple representing a texel index position. Of course, in alternative embodiments, x could be an n-tuple for filtering n-dimensional textures, such as two-dimensional or three-dimensional textures. However, a 1-tuple is selected for simplicity. Assuming a variable-width filter kernel, applying the contributions of texel 232a or texel a and texel 232b or texel b results in the following:

$$f_{ab}=k(|x-x'_a|/\omega)d_a+k(|x-x'_b|/\omega)d_b$$

wherein $x'_a$ corresponds to interpolated index 249a and $x'_b$ corresponds to interpolated index 249b, each index interpolated towards texel 232c of mipmap 231b as shown in FIG. 2b. Since it is already known that a box prefilter was used to generate mipmaps 231a-231b, the data value $d_c$ for texel 232c or texel c can be derived by a simple average as indicated above with FIG. 2a.

To confirm that this x-lerping method is providing correct results, it may be instructive to use a test case at the verge of a mipmap transition. Thus, given:

$$\lambda=1$$

$$\omega=2$$

$$x'_a=x'_b=(x'_a+x'_b)/2=x'_c$$

and combining with the equation for $f_{ab}$ and $d_c$ as listed above, the result is:

$$f_{ab}=2k(|x-x_c|/2)d_c$$

which matches the contribution of texel 232c after the transition. It should be noted that the extra factor of 2 drops out during kernel normalization since an extra factor of 2 will be included in the denominator during convolution and cancelled out, and the division by 2 reflects the difference in resolution between mipmap 231a and mipmap 231b. As a result of the filter kernel position interpolation process shown in FIG. 2b and the x-lerping interpolation described above, a seamless rendering similar to rendered scene 355b of FIG. 3 can be generated, again without ever needing to access the texels of mipmap 231b.

FIG. 4 presents a diagram illustrating filter kernel interpolation for seamless mipmap filtering using several different filter kernels with or without x-lerping, according to one embodiment of the present invention. Diagram 400 of FIG. 4 includes rendered scenes 455a-455h. With regards to FIG. 4, it should be noted that rendered scenes 455a-455h correspond to rendered scene 155 from FIG. 1.

Although filter kernel value interpolation results in an interpolation identical to the traditional interpolation or lerping process, filter kernel position interpolation provides results that may appear of higher quality with fewer artifacts resulting from mipmap transitions. FIG. 4 highlights these differences by showing rendered scenes 455a-455d produced with traditional mipmap interpolation techniques and rendered scenes 455e-455h resulting from x-lerping. As shown in FIG. 1, rendered scenes 455a and 455e correspond to a tent filter kernel, rendered scenes 455d and 455f correspond to a gaussian filter kernel, rendered scenes 455c and 455g correspond to a gaussian filter kernel with smoothing, and rendered scenes 455d and 455h correspond to a contour filter kernel to emphasize artifacts resulting from mipmap transitions.

Comparing rendered scene 455d and rendered scene 455h, for example, a discontinuous gap artifact can be plainly observed towards the upper-left of the curve in rendered scene 455d, whereas the curve is smooth throughout without any abrupt discontinuities in rendered scene 455h. Similarly, rendered scene 455a appears to have similar gap artifacts whereas the corresponding x-lerped rendered scene 455e has none. As a result, textures using x-lerping for interpolation may benefit from smoother rendering of textures while minimizing distracting artifacts.

However, even with x-lerping, there is still the problem of $C^1$ discontinuities at mipmap transition points where the texel shift suddenly changes direction. This is most easily observed in rendered scene 455e, where it appears that the rendering is changing directions up and down at each mipmap transition. Although the gaussian filter for rendered scenes 455b and 455f hides this somewhat due to edge blurring, the mipmap transitions are still clearly visible, particularly with rendered scene 455b. To avoid this sudden shift, the interpolation fraction may be smoothed, for example:

$$\lambda'=\lambda^2(3-2\lambda)$$

where $\lambda'$ is the smoothed interpolation fraction to replace the standard interpolation fraction $\lambda$ used throughout the equations described above. The effects of this smoothing can be observed in rendered scenes 455c and 455g, where the sudden shifts are no longer discernable. As a result, high quality filtering can be maintained while expensive extraneous I/Os to read ripmaps are minimized, accelerating rendering speed.

Figure 5:
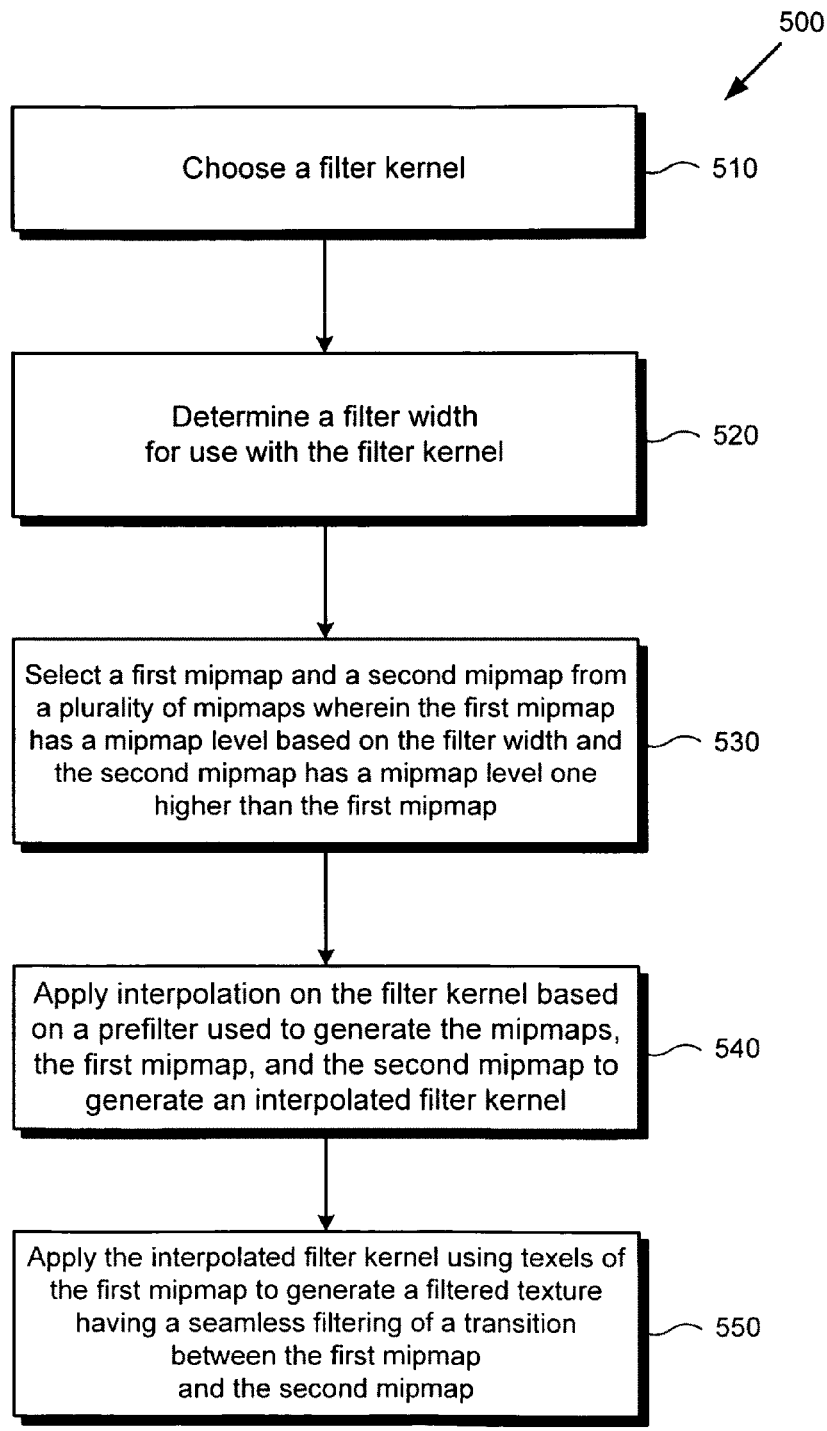
FIG. 5 shows a flowchart describing the steps, according to one embodiment of the present invention, by which a rendering device may implement filter kernel interpolation for seamless filtering of transitions within a plurality of mipmaps.

FIG. 5 shows a flowchart describing the steps, according to one embodiment of the present invention, by which a rendering device may implement filter kernel interpolation for seamless filtering of transitions within a plurality of mipmaps. Certain details and features have been left out of flowchart 500 that are apparent to a person of ordinary skill in the art. For example, a step may comprise one or more substeps or may involve specialized equipment or materials, as known in the art. While steps 510 through 550 indicated in flowchart 500 are sufficient to describe one embodiment of the present invention, other embodiments of the invention may utilize steps different from those shown in flowchart 500.

Referring to step 510 of flowchart 500 in FIG. 5 and environment 100 of FIG. 1, step 510 of flowchart 500 comprises processor 111 of rendering device 110 choosing filter kernel 145. As previously discussed, filter kernel 145 may be any suitable filter kernel, such as tent, gaussian, B-spline, or some other filter function.

Referring to step 520 of flowchart 500 in FIG. 5 and environment 100 of FIG. 1, step 520 of flowchart 500 comprises processor 111 of rendering device 110 determining a filter width for use with filter kernel 145 chosen from step 510. As previously discussed, rendering program 115 may determine a projected surface for texture mapping base-image texture 120 based on a particular camera view. After rendering program 115 determines the resolution required for texture mapping, it can then determine the proper filter width to use.

Referring to step 530 of flowchart 500 in FIG. 5 and environment 100 of FIG. 1, step 530 of flowchart 500 comprises processor 111 of rendering device 110 selecting a first mipmap and a second mipmap from mipmap set 130, where the first mipmap has a mipmap level based on the filter width determined in step 520, and the second mipmap has a mipmap level one higher than the first mipmap. In one embodiment, this is the same as the equation as previously discussed:

$$L=\text{floor}(\log_2 w)$$

wherein w represents the filter width determined from step 520, the first mipmap has a mipmap level L, and the second mipmap has a mipmap level L+1. Similar formulations using, for example, a ceiling function or a constant subtractive offset may be used as well. Continuing with the example used in step 520, if the filter width from step 520 is determined to be 10 pixels, then:

$$L=\text{floor}(\log_2 10)=3$$

As a result, the first mipmap has a mipmap level 3 and the second mipmap has a mipmap level 4 if the filter width from step 520 is 10 pixels.

Referring to step 540 of flowchart 500 in FIG. 5 and environment 100 of FIG. 1, step 540 of flowchart 500 comprises processor 111 of rendering device 110 applying interpolation 135 on filter kernel 145 chosen from step 510 to generate an interpolated filter kernel, or filter kernel 145 using interpolated kernel weights 140. The step of interpolation 135 is based on prefilter 125 and mipmaps 131*d*-131*e* selected from step 530. Two alternative approaches to implementing interpolation 135 have been discussed in detail: filter kernel value interpolation, which is described with FIG. 2*a*, and filter kernel position interpolation with x-lerping, which is described with FIG. 2*b* above. As previously noted, if prefilter 125 is a box filter, then the implementation of these filter kernel interpolations can simplify mathematically into particularly efficient implementations. Each method has its own advantages and limitations, so the selection of a particular interpolation implementation may depend on the particular requirements of a rendering project. At the end of step 540, the result is the creation of interpolated kernel weights 140, ready to use with filter kernel 145 to apply to any texture data, such as mipmap 131*d*.

Referring to step 550 of flowchart 500 in FIG. 5 and environment 100 of FIG. 1, step 550 of flowchart 500 comprises processor 111 of rendering device 110 applying filter kernel 145 using interpolated kernel weights 140 generated from step 540 to mipmap 131*d* selected from step 530 to generate filtered texture 150 having a seamless filtering between mipmaps 131*d*-131*e* selected from step 530. This seamless filtering is due to the combination of steps 540 and 550, as illustrated and explained in conjunction with FIGS. 3 and 4 above. In addition, processor 111 may optionally smoothen an interpolation fraction used for filter kernel 145 as previously discussed. Filtered texture 150 may then be combined with other filtered textures into rendered scene 155 for output to display 160 or for writing to storage for future output to display 160 or another display.

As the described invention is applicable to any rendering pipeline that uses mipmaps, it has broad applicability to a wide range of rendering systems such as, for example, RenderMan for generating film quality animation, OpenGL or DirectX for real-time rendering applications such as simulations or videogames, and hardware accelerated video cards or specialized rendering hardware. More specifically, in situations where large quantities of high quality textures and associated mipmaps need to be accessed with minimal I/O penalties such as large networked server rendering clusters, the described invention may help make more efficient use of existing computing resources while also providing improved image rendering quality. This may be of particular importance to 3D film rendering studios having limited budgets for constantly upgrading hardware infrastructure.

From the above description of the invention it is manifest that various techniques can be used for implementing the concepts of the present invention without departing from its scope. Moreover, while the invention has been described with specific reference to certain embodiments, a person of ordinary skills in the art would recognize that changes can be made in form and detail without departing from the spirit and the scope of the invention. As such, the described embodiments are to be considered in all respects as illustrative and not restrictive. It should also be understood that the invention is not limited to the particular embodiments described herein, but is capable of many rearrangements, modifications, and substitutions without departing from the scope of the invention.

What is claimed is:

1. A method of implementing a filter kernel interpolation for seamless filtering of transitions within a plurality of mipmaps derived from a base-image texture filtered using a prefilter, the method comprising:
   determining a filter width in pixels for use with a filter kernel, the pixels corresponding to texels of the base-image texture;
   selecting a first mipmap and a second mipmap from the plurality of mipmaps wherein the first mipmap has a mipmap level based on the filter width, and the second mipmap has a mipmap level one higher than the first mipmap;
   applying interpolation on the filter kernel based on the prefilter, the first mipmap, and the second mipmap to generate an interpolated filter kernel, wherein applying the interpolation interpolates an index position of each texel in the first mipmap such that the index position of each texel in the first mipmap is moved, in the mipmap level of the first mipmap, from a center of the index position of each texel in the first mipmap towards a center of a corresponding texel in the second mipmap; and
   applying the interpolated filter kernel to the first mipmap, without applying the interpolated filter kernel to the second mipmap, to generate a filtered texture having a filtering of a transition between the first mipmap and the second mipmap.

2. The method of claim 1, wherein the prefilter is a box prefilter.

3. The method of claim 2, wherein the filter kernel uses a variable width.

4. The method of claim 1, wherein applying the interpolation further:
   determines a first kernel weight and second kernel weight of every two adjacent texels from the first mipmap and a third kernel weight of a corresponding texel from the second mipmap; and
   interpolates the first kernel weight and the second kernel weight towards the third kernel weight for the every two adjacent texels from the first mipmap.

5. The method of claim 1, wherein each texel is all n-tuple in an n dimensional domain, wherein n is at least two.

6. The method of claim 5, wherein n is equal to three.

7. The method of claim 5, wherein the applying of the interpolated filter kernel is separable into each dimension.

8. The method of claim 5, wherein the filter kernel is non-separable.

9. The method of claim 1, wherein the applying the interpolated filter kernel uses anisotropy.

10. The method of claim 9, wherein the applying of the interpolated filter kernel uses mipmaps or asymmetric reductions of the base-image texture.

11. The method of claim 1, wherein the applying the interpolation uses a smoothing function to remove position shifting artifacts attributable to a $C^1$ discontinuity caused by the first mipmap and the second mipmap transitioning to adjacent mipmap levels.

12. The method of claim 1 further comprising outputting the filtered texture to a display.

13. A rendering device implementing a filter kernel interpolation for seamless filtering of mipmap transitions, the rendering device comprising:
   a memory including:
      a base-image texture;
      a plurality of mipmaps derived from the base-image texture filtered using a prefilter; and
   processor configured to:
      determine a filter width in pixels for use with a filter kernel, the pixels corresponding to texels of the base-image texture;
      select a first mipmap and a second mipmap from the plurality of mipmaps wherein the first mipmap has a mipmap level based on the filter width and the second mipmap has a mipmap level one higher than the first mipmap;

apply interpolation on the filter kernel based on the prefilter, the first mipmap, and the second mipmap to generate an interpolated filter kernel, wherein applying the interpolation interpolates an index position of each texel in the first mipmap such that the index position of each texel in the first mipmap is moved, in the mipmap level of the first mipmap, from a center of the index position of each texel in the first mipmap towards a center of a corresponding texel in the second mipmap; and apply the interpolated filter kernel to the first mipmap, without applying the interpolated filter kernel to the second mipmap, to generate a filtered texture having a filtering of a transition between the first mipmap and the second mipmap.

14. The rendering device of claim 13, wherein the prefilter is a box prefilter.

15. The rendering device of claim 14, wherein the filter kernel uses a variable width.

16. The rendering device of claim 13, wherein the processor is configured to further apply the interpolation by:

determining a first kernel weight and second kernel weight of every two adjacent texels from the first mipmap and a third kernel weight of a corresponding texel from the second mipmap; and interpolating the first kernel weight and the second kernel weight towards the third kernel weight for the every two adjacent texels from the first mipmap.

17. The rendering device of claim 13, wherein each texel is an n-tuple in an n dimensional domain, wherein n is at least two.

18. The rendering device of claim 17, wherein n is equal to three.

19. The rendering device of claim 17, wherein the processor is configured to apply the interpolated filter kernel separably into each dimension.

20. The rendering device of claim 17, wherein the filter kernel is non-separable.

21. The rendering device of claim 13, wherein the processor is configured to apply the interpolated filter kernel with anisotropy.

22. The rendering device of claim 21, wherein the processor is configured to apply the interpolated filter kernel using ripmaps or asymmetric reductions of the base-image texture.

23. The rendering device of claim 13, wherein the processor is configured to apply the interpolation using a smoothing function to remove position shifting artifacts attributable to a $C^1$ discontinuity caused by the first mipmap and the second mipmap transitioning to adjacent mipmap levels.

24. The rendering device of claim 13, wherein the processor is further configured to output the filtered texture to a display.

* * * * *

UNITED STATES PATENT AND TRADEMARK OFFICE
CERTIFICATE OF CORRECTION

PATENT NO. : 9,082,216 B2  
APPLICATION NO. : 12/459560  
DATED : July 14, 2015  
INVENTOR(S) : Brent Burley Page 1 of 1

It is certified that error appears in the above-identified patent and that said Letters Patent is hereby corrected as shown below:

In the claims,

Column 10, line 46, Claim 10, "mipmaps" should be changed to --ripmaps--

Signed and Sealed this
Eighth Day of September, 2015

Michelle K. Lee
*Director of the United States Patent and Trademark Office*